US009958659B2

(12) United States Patent
Yoshida

(10) Patent No.: US 9,958,659 B2
(45) Date of Patent: May 1, 2018

(54) MICROSCOPE OBJECTIVE LENS

(71) Applicant: NIKON CORPORATION, Tokyo (JP)

(72) Inventor: Miwako Yoshida, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days. days.

(21) Appl. No.: 15/131,694

(22) Filed: Apr. 18, 2016

(65) Prior Publication Data

US 2017/0023783 A1 Jan. 26, 2017

Related U.S. Application Data

(63) Continuation of application No. 13/760,681, filed on Feb. 6, 2013, now Pat. No. 9,341,832, which is a continuation of application No. PCT/JP2011/066181, filed on Jul. 15, 2011.

(30) Foreign Application Priority Data

Aug. 25, 2010 (JP) .................................. 2010-187827

(51) Int. Cl.
*G02B 21/02* (2006.01)
*G02B 27/00* (2006.01)
*G02B 5/00* (2006.01)

(52) U.S. Cl.
CPC ......... *G02B 21/02* (2013.01); *G02B 27/0037* (2013.01); *G02B 5/005* (2013.01)

(58) Field of Classification Search
CPC ....... G02B 21/02; G02B 9/00; G02B 27/0037
USPC .................................................. 359/558, 576
See application file for complete search history.

(56) References Cited

U.S. PATENT DOCUMENTS

| 5,631,779 A | 5/1997 | Kashima |
| 5,748,372 A | 5/1998 | Kitagawa |
| 7,848,027 B2 | 12/2010 | Yoshida |
| 9,341,832 B2 * | 5/2016 | Yoshida ................ G02B 21/02 |

(Continued)

FOREIGN PATENT DOCUMENTS

| JP | H08-286113 A | 11/1996 |
| JP | H08297247 A | 11/1996 |

(Continued)

OTHER PUBLICATIONS

Jan. 15, 2016 Notice of Allowance issued in U.S. Appl. No. 13/760,681.

(Continued)

*Primary Examiner* — Jordan Schwartz
*Assistant Examiner* — George G King
(74) *Attorney, Agent, or Firm* — Oliff PLC

(57) ABSTRACT

A microscope objective lens includes, in order from an object side, a first lens group having positive refractive power, a second lens group having positive refractive power, and a third lens group having negative refractive power, and is configured such that the first lens group includes, on the most object side, a positive meniscus lens whose concave surface is directed to the object side, such that the second lens group includes a diffractive optical element having positive refractive power, and such that the diffractive optical element is arranged at a position closer to the image than a portion at which the diameter of a light flux passing through the first lens group and the second lens group is the largest.

8 Claims, 7 Drawing Sheets

(56) References Cited

U.S. PATENT DOCUMENTS

| | | | |
|---|---|---|---|
| 2004/0070846 A1* | 4/2004 | Dobschal | G02B 21/02 |
| | | | 359/795 |
| 2010/0172034 A1 | 7/2010 | Yoshida | |
| 2011/0090565 A1 | 4/2011 | Yoshida et al. | |
| 2011/0102899 A1 | 5/2011 | Taeko et al. | |

FOREIGN PATENT DOCUMENTS

| | | |
|---|---|---|
| JP | 2009-192988 A | 8/2009 |
| JP | 2009-251554 A | 10/2009 |
| WO | 2009/041546 A1 | 4/2009 |
| WO | 2009/107610 A1 | 9/2009 |
| WO | 2009/125778 A1 | 10/2009 |

OTHER PUBLICATIONS

Mar. 3, 2015 Office Action issued in U.S. Appl. No. 13/760,681.
Aug. 11, 2015 Office Action issued in U.S. Appl. No. 13/760,681.
Aug. 29, 2014 Office Action issued in Chinese Application No. 201180031598.5.
Nov. 1, 2011 International Search Report issued in International Application No. PCT/JP2011/066181.
Oct. 12, 2017 Extended European Search Report issued in European Patent Application No. 11819707.8.

* cited by examiner

MICROSCOPE OBJECTIVE LENS

This is a Continuation of application Ser. No. 13/760,681 filed Feb. 6, 2013, which is a continuation of PCT/JP2011/066181 filed Jul. 15, 2011, which claims the benefit of Japanese Application No. 2010-187827 filed Aug. 25, 2010. The disclosure of the prior applications is hereby incorporated by reference herein in its entirety.

TECHNICAL FIELD

The present invention relates to a microscope objective lens.

BACKGROUND ART

Since, according to a recent tendency to higher integration of semiconductor devices, a fine pattern needs to be observed as a clear image at a high magnification, a large numerical aperture and advanced aberration correction including chromatic aberration are required for an objective lens used in a microscope apparatus for observing a sample, such as a semiconductor and a printed board. Further, a sufficient working distance is also required in terms of working efficiency and operability. Conventionally, as an objective lens which has a high magnification and a high numerical aperture and in which chromatic aberration is well corrected, there is known, for example, an objective lens disclosed in Patent Literature 1.

CITATION LIST

Patent Literature

[Patent Literature 1] Japanese Patent Laid-Open No. 2009-192988

SUMMARY OF INVENTION

Technical Problem

However, in such conventional microscope objective lens, although a high numerical aperture is obtained and also the chromatic aberration is well corrected, it cannot be said that the working distance is sufficient in terms of the operability of the microscope apparatus to which the microscope objective lens is attached.

The present invention has been made in view of the above described circumstances. An object of the present invention is to provide a microscope objective lens which has a high numerical aperture and is apochromatic for chromatic aberration, and further in which a long working distance is obtained and also the aberration is well corrected even in the periphery of the visual field.

Solution to Problem

In order to solve the above-described problems, a microscope objective lens according to the present invention includes, in order from the object side, a first lens group having positive refractive power, a second lens group having positive refractive power, and a third lens group having negative refractive power, and is configured such that the first lens group includes, on the most object side, a positive meniscus lens whose concave surface is directed to the object side, such that the second lens group includes a diffractive optical element having positive refractive power, and such that the diffractive optical element is arranged at a position closer to the image than a portion at which the diameter of a light flux passing through the first lens group and the second lens group is the largest.

Further, in the microscope objective lens, the following expressions are satisfied:

$$n1 \geq 1.8$$

$$0.5 \leq (-r1)/F \leq 4.5$$

$$\Phi DOE/\Phi max < 0.9$$

where the refractive index relative to the d-line of the medium of the positive meniscus lens arranged on the most object side in the first lens group is set as n1; the radius of curvature of the most object side lens surface of the first lens group is set as r1 which has a negative sign when the concave surface of the positive meniscus lens is directed to the object side and has a positive sign when the convex surface of the positive meniscus lens is directed to the object side; the focal length of the whole lens system is set as F; the maximum diameter of the light flux passing through the first lens group and the second lens group is set as $\Phi max$; and the maximum diameter of the light flux passing through the diffractive optical surface of the diffractive optical element is set as $\Phi DOE$.

In the microscope objective lens, it is preferred that, when the combined focal length of the first lens group and the second lens group is set as f12, and when the focal length of the third lens group is set as f3, the following expression is satisfied:

$$0.3 \leq f12/(-f3) \leq 2$$

Further, in the microscope objective lens, it is preferred that, when the focal length of the diffractive optical element is set as fDOE, the following expression is satisfied:

$$100 \leq fDOE/F \leq 1000$$

Further, in the microscope objective lens, it is preferred that the third lens group includes at least one cemented lens, and that, when the partial dispersion ratio θgF is defined as:

$$\theta gF = (ng-nF)/(nF-nC)$$

where the refractive index relative to the g-line is set as ng; the refractive index relative to the F-line is set as nF; and the refractive index relative to the C-line is set as nC, and when the difference in the partial dispersion ratio between the positive lens and the negative lens which configure the cemented lens provided in the third lens group is set as ΔθgF3, and the difference in the Abbe number between the positive lens and the negative lens is set as Δv3, the following expression is satisfied:

$$-0.0035 \leq \Delta\theta gF3/\Delta v3 \leq -0.002$$

Further, in the microscope objective lens, it is preferred that the second lens group includes at least one cemented lens, and that, when the partial dispersion ratio θgF is defined as:

$$\theta gF = (ng-nF)/(nF-nC)$$

where the refractive index relative to the g-line is set as ng; the refractive index relative to the F-line is set as nF; and the refractive index relative to the C-line is set as nC, and when the difference in the partial dispersion ratio between the positive lens and the negative lens which configure the cemented lens provided in the second lens group is set as ΔθgF2, and the difference in the Abbe number between the positive lens and the negative lens is set as $\Delta v2$, the following expression is satisfied:

$$-0.0025 \leq \Delta\theta gF2/\Delta v2 - 0.0006$$

Further, in the microscope objective lens, it is preferred that, when the focal length of the first lens group is set as f1, and when the focal length of the second lens group is set as f2, the following expressions is satisfied:

$$2 \leq f1/F \leq 10$$

$$15 \leq f2/F \leq 30$$

Advantageous Effects of Invention

With the configuration described above, it is possible to provide a microscope objective lens which is apochromatic for chromatic aberration, and further in which a long working distance is obtained and also the aberration is well corrected even in the periphery of the visual field.

DESCRIPTION OF EMBODIMENT

Figure 1:
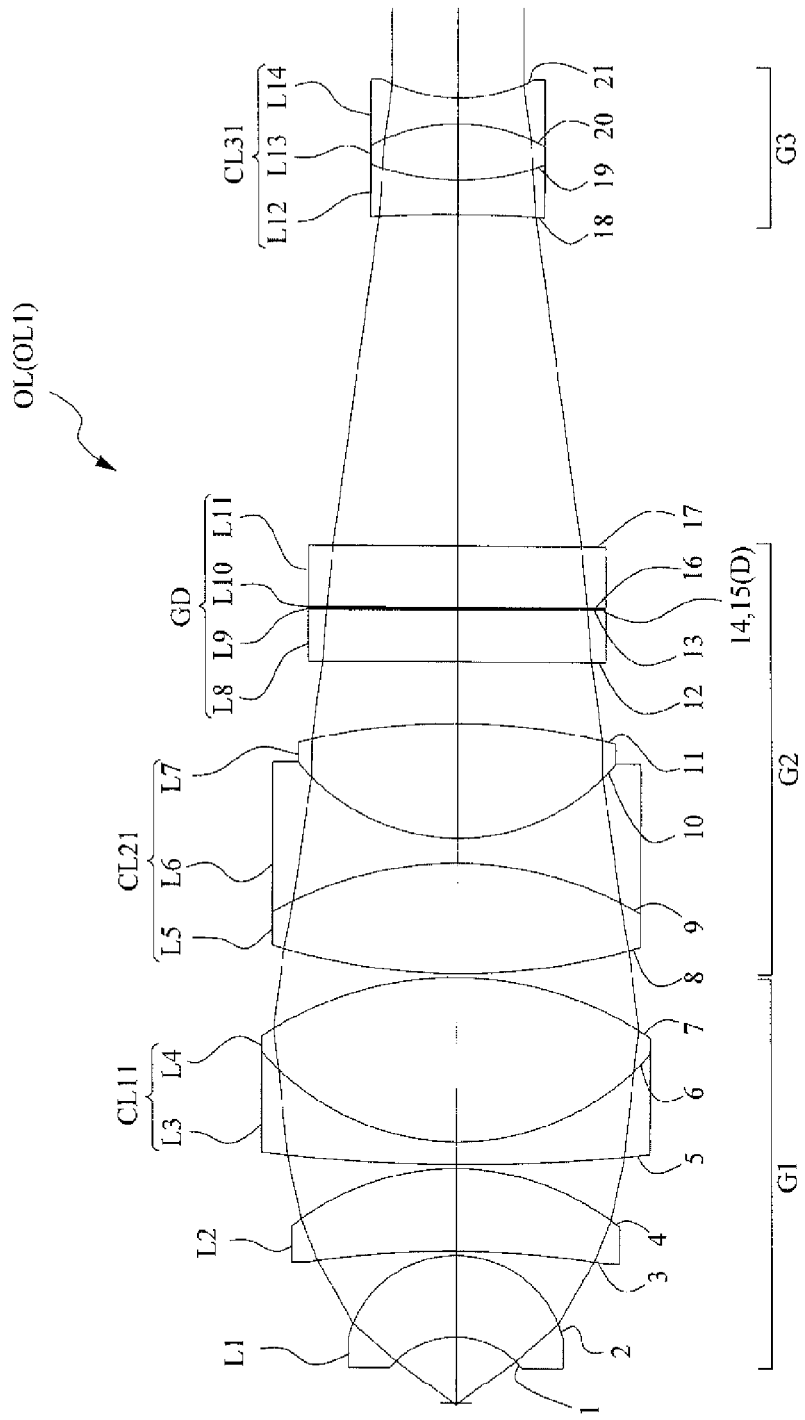
FIG. 1 is a view showing a lens configuration of a microscope objective lens according to a first example.

In the following, preferred embodiments according to the present invention will be described with reference to the accompanying drawings. First, a configuration of a microscope objective lens according to the present embodiment will be described with reference to FIG. 1. A microscope objective lens OL includes, in order from the object side, a first lens group G1 having positive refractive power, a second lens group G2 having positive refractive power, and a third lens group G3 having negative refractive power.

In the microscope objective lens OL, the first lens group G1 is a lens group which guides diverging light from an object to the second lens group G2 by converting the light into a light flux close to a parallel light flux while reducing the angle of the light with respect to the optical axis of the lens group. The first lens group G1 includes, on the most object side, a positive meniscus lens whose concave surface is directed to the object side (for example, a positive meniscus lens L1 in FIG. 1).

Further, the second lens group G2 is a lens group which converts the light flux from the first lens group G1 into converging light, and mainly corrects axial chromatic aberration, chromatic spherical aberration, and high order aberration components. For this reason, the second lens group G2 includes a diffractive optical element GD having positive refractive power. Here, the diffractive optical element GD is arranged at a position closer to the image than a portion at which the diameter of a light flux passing through the first lens group G1 and the second lens group G2 is the largest. Further, the second lens group G2 includes at least one cemented lens (for example, cemented lens CL11 in FIG. 1), in order to correct the above-described aberrations.

The diffractive optical element GD (diffractive optical surface D) provided in the second lens group G2 has a negative dispersion value (Abbe number=−3.453). Dispersion is large, and anomalous dispersibility (partial dispersion ratio (ng−nF)/(nF−nC)=0.2956 in the example described below). Therefore, the diffractive optical element GD has powerful chromatic aberration correction capability. Although the Abbe number of an optical glass is usually about 30 to 80, the Abbe number of the diffractive optical element is a negative value as described above. In other words, the diffractive optical surface D of the diffractive optical element GD has dispersion characteristics opposite of those of the normal glass (refractive optical element) A refractive index decreases with a decrease in the wavelength of the light, and light with a longer wavelength is bent more. Therefore, a large achromatic effect can be attained by a combination with the normal refractive optical element. As a result, the use of the diffractive optical element GD allows favorable correction of chromatic aberration that cannot be attained by the normal optical glass.

The diffractive optical element GD in the present embodiment is so-called a "contact multi-layered diffractive optical element" in which two diffractive element factors respectively made of different optical materials (for example, optical members L9 and L10 in the case of FIG. 1) are bonded to each other, and in which the diffractive optical surface D is formed by providing diffraction grating grooves on the bonded surface. For this reason, the diffractive optical element can have high diffraction efficiency in a wide wavelength region including the g-line to C-line. Therefore, the microscope objective lens OL according to the present embodiment can be used in the wide wavelength band. Note that, when first order diffracted light is used in a transmission type diffractive optical element, the diffraction efficiency is expressed as a ratio $\eta$ between the intensity I0 of the incident light and the intensity I1 of the first order diffracted light (=I1/I0×100 [%]).

Further, the contact multi-layered diffractive optical element can be manufactured by a simpler process as compared with a so-called separate multi-layered diffractive optical element which is formed in such a manner that two diffractive element factors, each having diffraction grating grooves formed thereon, are arranged close to each other so that the diffraction-grating grooves face each other. For this reason, the contact multi-layered diffractive optical element has advantages that mass production efficiency is good and that the diffraction efficiency with respect to the incident angle of a ray is good. Therefore, the microscope objective lens OL according to the present embodiment, in which the contact multi-layered diffractive optical element is used, can be easily manufactured and also has good diffraction efficiency.

Further, the third lens group G3 is a lens group which converts the converging light flux from the second lens group G2 into a substantially parallel light flux. The third lens group G3 includes at least one cemented lens (for example, cemented lens CL31 in FIG. 1), in order to correct chromatic aberration.

In the following, conditions for configuring the microscope objective lens OL according to the present embodiment will be described.

First, in the microscope objective lens OL according to the present embodiment, it is preferred that, when the refractive index relative to the d-line of the medium of the positive meniscus lens L1, which is arranged on the most object side of the first lens group G1, and the concave surface of which is directed to the object side, is set as n1, the following conditional expression (1) is satisfied.

$$n1 \leq 1.8 \qquad (1)$$

When this conditional expression (1) is satisfied, the curvature of the lens surface of the positive meniscus lens L1 flattens, so that the aberration is well maintained. Further, increasing the negative refractive power of the concave lens surface (first surface) directed to the object side causes a negative Petzval sum, so that the flatness can be maintained.

Further, in the microscope objective lens OL according to the present embodiment, it is preferred that, when the radius of curvature of the most object-side lens surface of the first lens group G1, that is, the object-side lens surface (the first surface in FIG. 1) of the positive meniscus lens L1 is set as r1, and when the focal length of the entire system of the microscope objective lens OL is set as F, the following conditional expression (2) is satisfied.

$$0.5 \leq (-r1)/F \leq 4.5 \qquad (2)$$

Conditional expression (2) defines the radius of curvature of the most object-side lens surface of the microscope objective lens OL. Since, when the value is smaller than the lower limit value of conditional expression (2), the curvature of the first surface becomes too steep, the light flux diverges too much and correction of the spherical aberration by the subsequent lens groups becomes more difficult, so that the aberration is deteriorated. On the contrary, since, when the value is larger than the upper limit value of conditional expression (2), the curvature of the first surface becomes too flat, high order spherical aberration in the first surface occurs in a microscope objective lens having a high numerical aperture. Note that, when the upper limit value of conditional expression (2) is set to 4.2, the effect of the present invention can be further exhibited. Further, when the upper limit value of conditional expression (2) is set to 4.0, the effect of the present invention can be further exhibited.

Further, in the microscope objective lens OL according to the present embodiment, it is preferred that, when the maximum diameter of the light flux passing through the first lens group G1 and the second lens group G2 is set as Φmax, and when the maximum diameter of the light flux passing through the diffractive optical surface D of the diffractive optical element GD is set as ΦDOE, the following conditional expression (3) is satisfied.

$$\Phi DOE/\Phi max < 0.9 \qquad (3)$$

Conditional expression (3) represents a condition of the maximum effective diameter of the ray passing through the diffractive optical surface D of the diffractive optical element GD. When the diffractive optical element GD (diffractive optical surface D) is arranged at a location at which the effective diameter of the light flux is large, high order spherical aberration and coma aberration are generated, and hence conditional expression (3) needs to be satisfied. Note that, when the upper limit value of conditional expression (3) is set to 0.8, the effect of the present invention can be further exhibited.

Further, in the microscope objective lens OL according to the present embodiment, it is preferred that, when the combined focal length of the first lens group G1 and the second lens group G2 is set as f12, and when the focal length of the third lens group G3 is set as f3, the following conditional expression (4) is satisfied.

$$0.3 \leq f12/(-f3) \leq 2 \qquad (4)$$

Conditional expression (4) defines the refractive power arrangement of the first lens group G1, the second lens group G2, and the third lens group G3. When the value is larger than the upper limit value of conditional expression (4), it becomes difficult to correct the high order aberration. On the contrary, when the value is smaller than the lower limit value of conditional expression (4), it becomes impossible to acquire a sufficient working distance.

Further, in the microscope objective lens OL according to the present embodiment, it is preferred that, when the focal length of the diffractive optical element GD is set as fDOE, the following conditional expression (5) is satisfied.

$$100 \leq fDOE/F \leq 1000 \qquad (5)$$

Conditional expression (5) defines the focal length of the diffractive optical element GD. When the value is larger than the upper limit value of conditional expression (5), the refractive power of the diffractive optical element GD is reduced, so that the diffractive optical element GD does not sufficiently contribute to correction of chromatic aberration. On the contrary, when the value is smaller than the lower limit value of conditional expression (5), the minimum pitch of the diffraction grating becomes too small, and thereby the performance of the diffractive optical element GD is greatly deteriorated due to the shape error of the diffraction grating, so that the manufacturing error needs to be more severely controlled.

Note that the diffractive optical element GD, which is arranged in the second lens group G2, is arranged at a portion at which the light flux from the object is converged, and hence high order aberration can be well corrected by the diffractive optical element GD.

Further, in the microscope objective lens OL according to the present embodiment, it is preferred that, when the difference in the partial dispersion ratio between the positive lens and the negative lens which configure the cemented lens provided in the third lens group G3 is set as ΔθgF3, and when the difference in the Abbe number with respect to the d-line (λ=587.562 nm) between the positive lens and the negative lens is set as Δν3, the following conditional expression (6) is satisfied. Further, each of the differences in the partial dispersion ratio and the Abbe number may be obtained by subtracting the value of the negative lens from that of the positive lens, or vice versa. When the difference in the partial dispersion ratio is obtained by subtracting the value of the negative lens from that of the positive lens, the difference in the Abbe number should be obtained by subtracting the value of the negative lens from that of the positive lens.

$$-0.0035 \leq \Delta\theta gF3/\Delta\nu 3 \leq -0.002 \qquad (6)$$

However, the partial dispersion ratio θgF is a numerical value defined by the following expression (a), in which ng, nF and nC respectively represent refractive indexes of the medium of each of the positive and negative lenses configuring the cemented lens with respect to the g-line (λ=435.835 nm), the F-line (λ=486.133 nm), and the C-line (λ=656.273 nm).

$$\theta gF=(ng-nF)/(nF-nC) \qquad (a)$$

Conditional expression (6) defines the differences in the partial dispersion ratio and the Abbe number between the positive lens and the negative lens of the cemented lens included in the third lens group G3. The diffractive optical element GD arranged in the second lens group G2 does not greatly contribute to correction of lateral chromatic aberration. For this reason, lateral chromatic aberration needs to be efficiently corrected by selection of the medium (glass material) of the cemented lens arranged in the third lens group G3. When the value is smaller than the lower limit value of conditional expression (6), the secondary spectrum of lateral chromatic aberration remains. On the contrary, when the value is larger than the upper limit value of conditional expression (6), the difference in the Abbe number is reduced, so that primary lateral chromatic aberration remains.

Further, in the microscope objective lens OL, it is preferred that, when the difference in the partial dispersion ratio between the positive lens and the negative lens configuring the cemented lens provided in the second lens group G2 is set as $\Delta\theta gF2$, and when the difference in the Abbe number with respect to the d-line between the positive lens and the negative lens is set as $\Delta v2$, the following conditional expression (7) is satisfied.

$$-0.0025 \leq \Delta\theta gF2/\Delta v2 \leq -0.0006 \quad (7)$$

Conditional expression (7) defines the differences in the partial dispersion ratio and the Abbe number between the positive lens and the negative lens of the cemented lens included in the second lens group G2. Usually, it is preferred that these differences are smaller. However, the diffractive optical element GD is used, and hence when the value is larger than the upper limit value of conditional expression (7), the secondary spectrum is excessively corrected. When the excessive correction of the secondary spectrum is adjusted by the diffractive optical element GD, the refractive power of the diffractive optical element GD is reduced, so that the diffractive optical element GD cannot sufficiently contribute to correction of chromatic aberration. On the contrary, when the value is smaller than the lower limit value of conditional expression (7), the secondary spectrum remains. When the secondary spectrum is corrected by the diffractive optical element GD, the minimum pitch of the diffraction grating is reduced, so that the optical performance is greatly affected by a manufacturing error.

Further, in the microscope objective lens OL according to the present embodiment, it is preferred that, when the focal length of the first lens group G1 is set as f1, the following conditional expression (8) is satisfied.

$$2 \leq f1/F \leq 10 \quad (8)$$

Conditional expression (8) defines the focal length of the first lens group G1. When the value is smaller than the lower limit value of conditional expression (8), the refractive power of the first lens group G1 becomes too large, so that spherical aberration, coma aberration, and the like, cannot be well corrected. On the contrary, when the value is larger than the upper limit value of conditional expression (8), the ray from the object cannot be converged, and thereby the diameter of the light flux becomes too large, so that the outer shape of the lenses configuring the first lens group G1 becomes large. Further, the height of the ray incident on subsequent lenses is increased, so that spherical aberration cannot be well corrected.

Further, in the microscope objective lens OL according to the present embodiment, it is preferred that, when the focal length of the second lens group G2 is set as f2, the following conditional expression (9) is satisfied.

$$15 \leq f2/F \leq 30 \quad (9)$$

Conditional expression (9) defines the focal length of the second lens group G2. When the value is smaller than the lower limit value of conditional expression (9), chromatic aberration and spherical aberration, which are generated in the first lens group G1, are not sufficiently corrected. On the contrary, when the value is larger than the upper limit value of conditional expression (9), the negative refractive power of the bonded surface of the cemented lens provided in the second lens group G2 becomes too large, so that high order spherical aberration is increased. Further, the height of the ray incident on the third lens group G3 is increased, so that it becomes difficult to correct the aberrations When the microscope objective lens according to the present embodiment is configured as described above, it is possible to provide a microscope objective lens which has a high magnification, a high numerical aperture and a sufficient working distance and is also apochromatic for chromatic aberration, and further in which the other aberrations are well corrected.

EXAMPLES

In the following, three examples of the microscope objective lens OL according to the present embodiment are described, and in each of the examples, the phase difference of the diffractive optical surface D formed in the diffractive optical element GD is calculated by an ultra-high refractive index method which is performed by using the usual refractive index and aspheric surface expression (b) described below. The ultra-high refractive index method is a method using a predetermined equivalence relationship between the aspheric shape and the grating pitch of the diffractive optical surface, and in the present example, the diffractive optical surface D is represented as data of the ultra-high refractive index method, that is, represented by aspheric surface expression (b) described below and the coefficients of the expression. Note that, in the examples, the d-line, C-line, F-line, and g-line are selected as targets of calculation of aberration characteristics. The following Table 1 shows the wavelengths of the d-line, C-line, F-line, and g-line used in the examples, and also shows the values of refractive indexes which are set for the respective spectrum lines and which are used for the calculation based on the ultra-high refractive index method.

TABLE 1

| | Wavelength | Refractive index (used in ultra-high refractive index method) |
|---|---|---|
| d-line | 587.562 nm | 10001.0000 |
| C-line | 656.273 nm | 11170.4255 |
| F-line | 486.133 nm | 8274.7311 |
| g-line | 435.835 nm | 7418.6853 |

In each of the examples, the aspheric surface is expressed by the following expression (b) in which the height in the direction vertical to the optical axis is set as y; the distance (sag amount) from the tangent plane of the vertex of each aspheric surface to the each aspheric surface along the optical axis at height y is set as S (y); the radius of curvature of the reference spherical surface (apical radius) is set as r; the conic constant is set as $\kappa$; and the n-th aspheric surface coefficient is set as An. Note that, in the following examples, "E-n" represents "$\times 10^{-n}$".

$$S(y) = (y^2/r)/\{1+(1-\kappa \times y^2/r^2)^{1/2}\} + A2 \times y^2 + A4 \times y^4 + A6 \times y^6 + A8 \times y^8 + A10 \times y^{10} \quad (b)$$

Note that, in each of the examples, a symbol "*" is attached to the right side of the surface number included in the table and corresponding to the lens surface on which the diffractive optical surface is formed, and aspheric surface expression (b) represents the specifications related to the performance of the diffractive optical surface.

Figure 7:
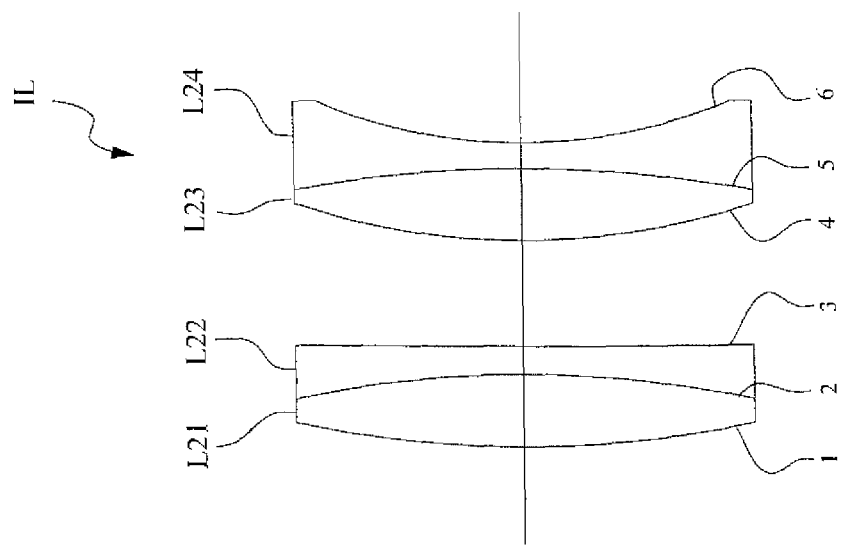
FIG. 7 is a view showing a lens configuration of an imaging lens used together with the microscope objective lens.

Further, each of microscope objective lenses OL1 to OL3 in the following examples is an infinity-corrected type configured as shown in FIG. 7, and is used together with an imaging lens IL having specifications shown in Table 2. Note that, in Table 2, the first column m represents the number of each of the optical surfaces from the object side; the second column r represents the radius of curvature of each of the optical surfaces; the third column d represents the distance (distance between surfaces) on the optical axis from each of the optical surfaces to the next optical surface; the fourth column nd represents the refractive index relative to the d-line; and the fifth column vd represents the Abbe number with respect to the d-line. Here, the refractive index 1.00000 of air is omitted. The description of the specifications of Table 2 is the same as that in each of the following examples.

TABLE 2

| M | r | d | nd | vd |
|---|---|---|---|---|
| 1 | 75.043 | 5.10 | 1.623 | 57.0 |
| 2 | −75.043 | 2.00 | 1.750 | 35.2 |
| 3 | 1600.580 | 7.50 | | |
| 4 | 50.256 | 5.10 | 1.668 | 42.0 |
| 5 | −84.541 | 1.80 | 1.613 | 44.4 |
| 6 | 36.911 | | | |

Note that the imaging lens IL is configured by, in order from the object side, a cemented lens formed by bonding a biconvex lens L21 and a biconcave lens L22 to each other, and a cemented lens formed by bonding a biconvex lens L23 and a biconcave lens L24 to each other.

First Example

FIG. 1 used in the above description shows the microscope objective lens OL1 according to a first example. As described above, the microscope objective lens OL1 is configured by, in order from the object side, a first lens group G1 having positive refractive power, a second lens group G2 having positive refractive power, and a third lens group G3 having negative refractive power. The first lens group G1 is configured by, in order from the object side, a positive meniscus lens L1 whose concave surface is directed to the object side, a positive meniscus lens L2 whose concave surface is directed to the object side, and a cemented lens CL11 formed by bonding together a negative meniscus lens L3 whose convex surface is directed to the object side, and a biconvex lens L4. Further, the second lens group G2 is configured by, in order from the object side, a cemented lens CL21 formed by bonding a biconvex lens L5, a biconcave lens L6, and a biconvex lens L7 to each other, and a plate-shaped diffractive optical element GD including a diffractive optical surface D. Further, the third lens group G3 is configured by a cemented lens CL31 formed by bonding a biconcave lens L12, a biconvex lens L13, and a biconcave lens L14 to each other.

Further, in the diffractive optical element GD, a plate-shaped optical glass L8, two optical members L9, L10 which are respectively formed of different resin materials, and a plate-shaped optical glass L11 are bonded together in this order, and diffraction grating grooves (diffractive optical surface D) are formed on the bonded surface of the optical members L9 and L10. That is, the diffractive optical element GD is a contact multi-layered diffractive optical element.

Table 3 shows specifications of the microscope objective lens OL1 according to the first example shown in FIG. 1. Note that, in Table 3, F represents the focal length of the whole system; NA represents the numerical aperture; β represents the magnification; and d0 represents the distance on the optical axis from the object to the vertex of the object side surface (first surface) of the first lens (positive meniscus lens L1). Further, f1 represents the focal length of the first lens group G1; f2 represents the focal length of the second lens group G2; f12 represents the combined focal length of the first lens group G1 and the second lens group G2; and f3 represents the focal length of the third lens group G3. Further, fDOE represents the focal length of the diffractive optical element GD; Φmax represents the maximum diameter of the light flux passing through the first lens group G1 and the second lens group G2; and ΦDOE represents the maximum diameter of the light flux passing through the diffractive optical surface D of the diffractive optical element GD. Note that the number of each of the optical surfaces shown in the first column m (the symbol * attached to the right side of the number represents the lens surface formed as the diffractive optical surface) corresponds to each of the surface numbers 1 to 21 shown in FIG. 1. Further, in the second column r, the radius of curvature 0.000 represents a plane. Further, as for the diffractive optical surface, the radius of curvature of the spherical surface, which is used as the reference of the aspheric surface serving as the base of the calculation, is shown in the second column r, and the data used for the ultra-high refractive index method are shown as aspheric surface data in the table of specifications. Further, Table 3 shows values respectively corresponding to the above-described conditional expressions (1) to (8), that is, values respectively corresponding to the conditions. The above description of the specifications of table is the same as that in the following examples.

Note that the radius of curvature r, the distance d between the surfaces, the focal length F of the whole system, and other lengths, which are described in all the following specifications, are generally expressed by the unit of "mm" unless otherwise specified. Since the equivalent optical performance is obtained even when the optical system is proportionally enlarged or proportionally reduced, the unit is not limited to "mm", and any other suitable unit can also be used.

TABLE 3

F = 4 mm
NA = 0.8
β = 50x
d0 = 3.38
f1 = 9.2
f2 = 114.2
f12 = 8.8
f3 = −22.4
Φmax = 17.92
ΦDOE = 12.80

| m | r | d | nd | vd |
|---|---|---|---|---|
| 1 | −4.220 | 4.00 | 1.903 | 35.7 |
| 2 | −5.421 | 0.20 | | |
| 3 | −47.354 | 4.00 | 1.603 | 65.3 |
| 4 | −12.900 | 0.20 | | |
| 5 | 85.133 | 1.10 | 1.517 | 52.4 |
| 6 | 12.610 | 8.00 | 1.498 | 82.5 |
| 7 | −16.869 | 0.20 | | |
| 8 | 30.992 | 5.35 | 1.640 | 60.1 |

TABLE 3-continued

| | | | | |
|---|---|---|---|---|
| 9 | −17.900 | 1.20 | 1.738 | 32.3 |
| 10 | 9.973 | 5.60 | 1.498 | 82.5 |
| 11 | −32.895 | 3.00 | | |
| 12 | 0.000 | 2.50 | 1.517 | 64.1 |
| 13 | 0.000 | 0.06 | 1.528 | 34.7 |
| 14 | 0.000 | 0.00 | 10001.000 | −3.5 |
| 15* | 0.000 | 0.06 | 1.557 | 50.2 |
| 16 | 0.000 | 3.00 | 1.517 | 64.1 |
| 17 | 0.000 | 16.10 | | |
| 18 | −67.221 | 1.70 | 1.652 | 58.5 |
| 19 | 12.651 | 2.70 | 1.717 | 29.5 |
| 20 | −9.076 | 1.25 | 1.517 | 52.3 |
| 21 | 8.270 | | | |

Diffractive optical surface data

Fifteenth surface   κ = 1 A2 = −5.9524E−08 A4 = 3.8419E−10
A6 = −4.8802E−12 A8 = 6.5871E−15
A10 = 0.00000E+00

Values corresponding to conditions (1) n1 = 1.903
(2) (−r1)/F = 1.06
(3) ΦDOE/Φmax = 0.71
(4) f12/(−f3) = 0.4
(5) fDOE/F = 210
(6) ΔθgF3/Δv3 = −0.0022, −0.0021
(7) ΔθF2/Δv2 = −0.0019, −0.0010
(8) f1/F = 2.3
(9) f2/F = 28.6

Note that, among the values corresponding to the conditions shown in Table 3, conditional expression (6) represents the values of the lenses L12 and L13, and the lenses L13 and L14 configuring the cemented lens CL31 included in the third lens group G3. Further, conditional expression (7) represents the values of the lenses L5 and L6, and the lenses L6 and L7 configuring the cemented lens CL21 included in the second lens group G2. In this way, it is seen that all the conditional expressions (1) to (9) are satisfied in the first example.

Figure 2:
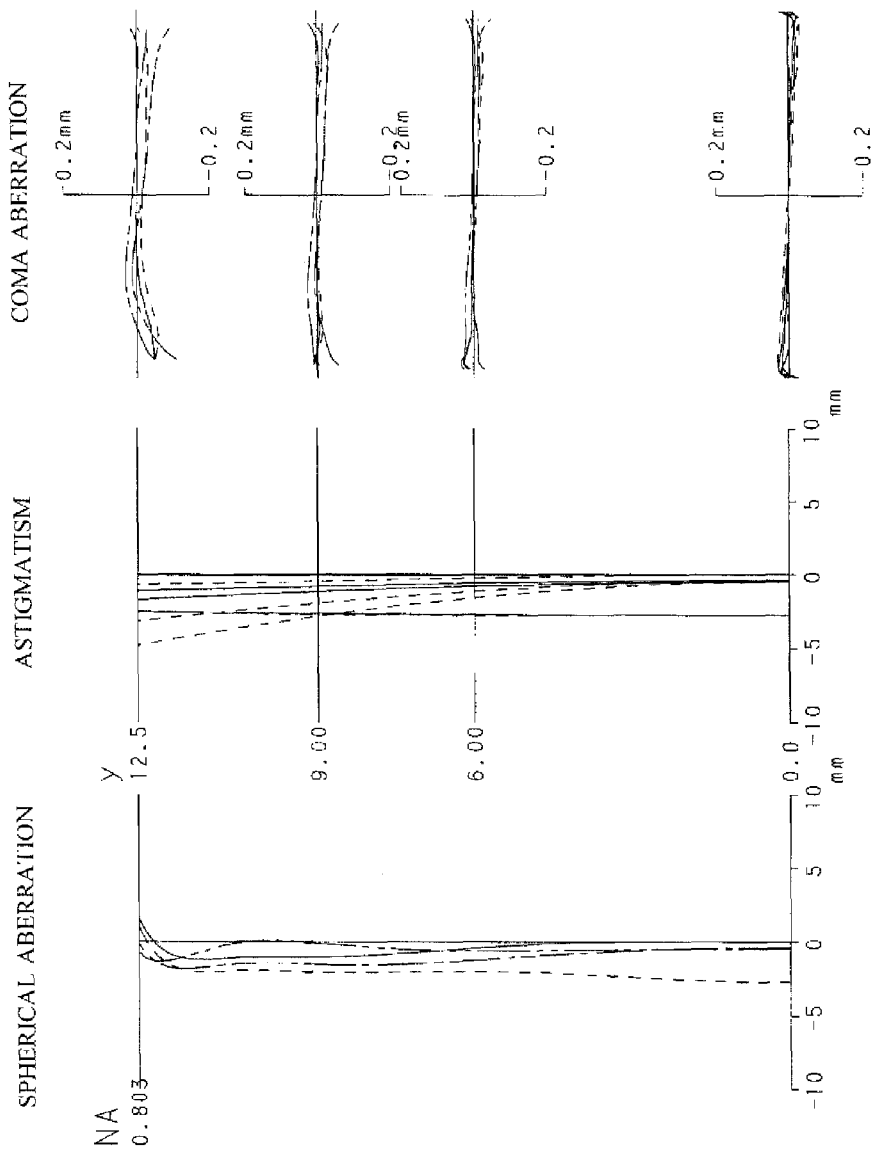
FIG. 2 shows aberration diagrams of the microscope objective lens according to the first example.

FIG. 2 shows aberration diagrams representing spherical aberrations, astigmatisms, and coma aberrations with respect to the rays of the d-line, the C-line, the F-line, and the g-line in the first example. Among the aberration diagrams, the spherical aberration diagram shows aberration amounts with respect to the numerical aperture NA, the astigmatism diagram shows aberration amounts with respect to the image height Y, and the coma aberration diagram shows aberration amounts at the time when the image height Y is set to 12.5 mm, 9.0 mm, 6.0 mm, and 0 mm. Further, in the spherical aberration diagram and the coma aberration diagram, the solid line corresponds to the d-line, the dotted line corresponds to the C-line, the broken-dotted line corresponds to the F-line, and the two-dot chain line corresponds to the g-line. Further, in the astigmatism diagram, the solid line represents the sagittal image surface with respect to the ray of each of the wavelengths, and the broken line represents the meridional image surface with respect to the ray of each of the wavelengths. The description of these aberration diagrams is the same as that in the following examples. As is apparent from each of the aberration diagrams shown in FIG. 2, it is seen that, in the first example, the respective aberrations are well corrected, and excellent image forming performance is secured.

Second Example

Figure 3:
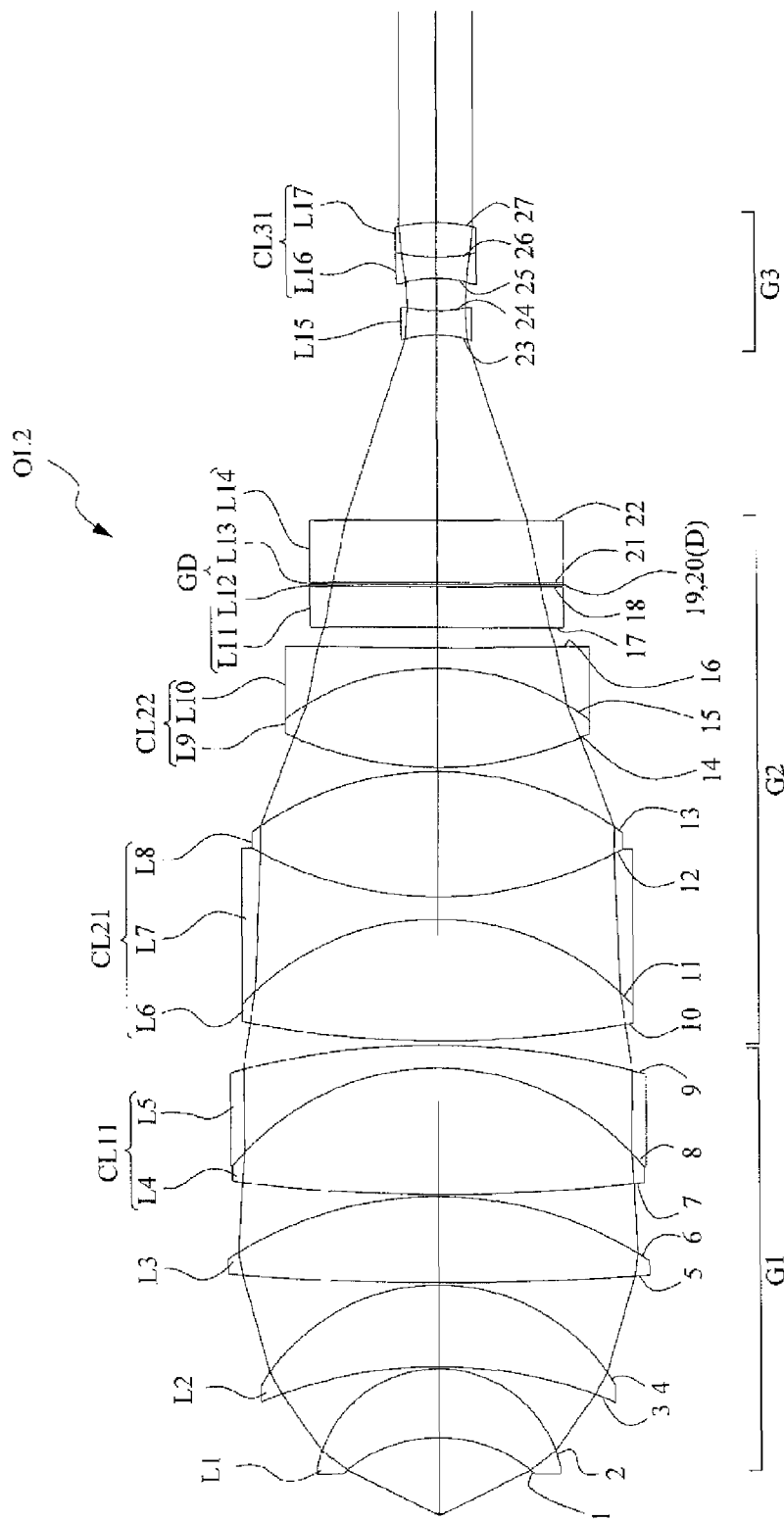
FIG. 3 is a view showing a lens configuration of a microscope objective lens according to a second example.

Next, the microscope objective lens OL2 shown in FIG. 3 will be described as a second example. The microscope objective lens OL2 shown in FIG. 3 is also configured by, in order from the object side, a first lens group G1 having positive refractive power, a second lens group G2 having positive refractive power, and a third lens group G3 having negative refractive power. The first lens group G1 is configured by, in order from the object side, a positive meniscus lens L1 whose concave surface is directed to the object side, a positive meniscus lens L2 whose concave surface is directed to the object side, a biconvex lens L3, and a cemented lens CL11 formed by bonding together a biconvex lens L4 and a negative meniscus lens L5 whose concave surface is directed to the object side. Further, the second lens group G2 is configured by, in order from the object side, a cemented lens CL21 formed by bonding a biconvex lens L6, a biconcave lens L7, and a biconvex lens L8 to each other, a cemented lens CL22 formed by bonding a biconvex lens L9 and a biconcave lens L10 to each other, and a plate-shaped diffractive optical element GD including a diffractive optical surface D. Further, the third lens group G3 is configured by, in order from the object side, a biconcave lens L15, and a cemented lens CL31 formed by bonding a biconcave lens L16 and a biconvex lens L17.

Further, in the diffractive optical element according to the second example, which is also a contact multi-layered diffractive optical element, a plate-shaped optical glass L11, two optical members L12 and L13 which are respectively formed of different resin materials, and a plate-shaped optical glass L14 are bonded together in this order, and diffraction grating grooves (diffractive optical surface D) are formed on the bonding surface of the optical members L12 and L13.

Table 4 shows specifications of the microscope objective lens OL2 according to the second example shown in FIG. 3. Note that the surface numbers shown in Table 4 correspond to the surface numbers 1 to 27 shown in FIG. 3.

TABLE 4

F = 2 mm
NA = 0.9
β = 100x
d0 = 3.81
f1 = 8.6
f2 = 36.4
f12 = 9.5
f3 = −6.1
Φmax = 19.79
ΦDOE = 10.36

| m | r | d | nd | vd |
|---|---|---|---|---|
| 1 | −7.160 | 3.40 | 1.883 | 40.8 |
| 2 | −6.151 | 0.10 | | |
| 3 | −23.001 | 4.00 | 1.498 | 82.5 |
| 4 | −10.283 | 0.10 | | |
| 5 | 135.400 | 4.20 | 1.498 | 82.5 |
| 6 | −19.100 | 0.10 | | |
| 7 | 82.148 | 6.20 | 1.498 | 82.5 |
| 8 | −13.130 | 1.10 | 1.613 | 44.3 |
| 9 | −39.504 | 0.20 | | |
| 10 | 50.990 | 5.95 | 1.498 | 82.5 |
| 11 | −13.200 | 1.10 | 1.654 | 39.7 |
| 12 | 18.697 | 6.10 | 1.498 | 82.5 |
| 13 | −15.801 | 0.20 | | |
| 14 | 17.850 | 4.85 | 1.498 | 82.5 |
| 15 | −12.450 | 1.00 | 1.804 | 39.6 |
| 16 | 231.728 | 1.00 | | |
| 17 | 0.000 | 2.00 | 1.517 | 64.1 |
| 18 | 0.000 | 0.10 | 1.528 | 34.7 |
| 19 | 0.000 | 0.00 | 10001.000 | −3.5 |
| 20* | 0.000 | 0.10 | 1.557 | 50.2 |
| 21 | 0.000 | 3.00 | 1.517 | 64.1 |
| 22 | 0.000 | 9.05 | | |

TABLE 4-continued

| | | | | |
|---|---|---|---|---|
| 23 | −5.917 | 1.15 | 1.713 | 53.9 |
| 24 | 6.350 | 1.60 | | |
| 25 | −5.331 | 1.00 | 1.564 | 60.7 |
| 26 | 9.204 | 1.70 | 1.755 | 27.5 |
| 27 | −7.900 | | | |

Diffractive optical surface data

| Twentieth surface | κ = 1 A2 = −8.0000E−08 A4 = 8.4238E−10 A6 = −1.2711E−11 A8 = 1.1492E−13 A10 = 0.00000E+00 |
|---|---|

Values corresponding to conditions (1) n1 = 1.883
(2) (−r1)/F = 3.58
(3) ΦDOE/Φmax = 0.52
(4) f12/(−f3) = 1.6
(5) fDOE/F = 312.5
(6) ΔθgF3/Δv3 = −0.0021
(7) ΔθgF2/Δv2 = −0.0008, −0.0008, −0.0008
(8) f1/F = 4.3
(9) f2/F = 18.2

Figure 4:
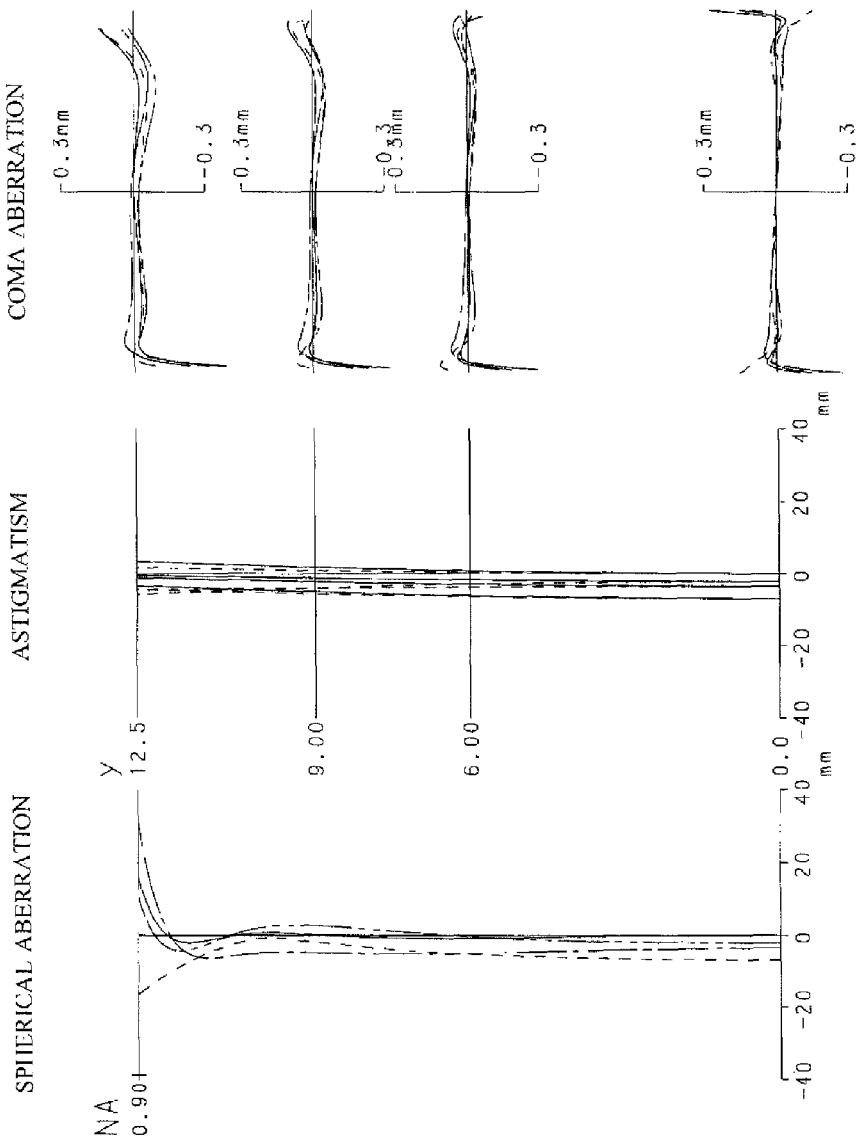
FIG. 4 shows aberration diagrams of the microscope objective lens according to the second example.

Note that, among the values corresponding to the conditions shown in Table 4, conditional expression (6) represents the value of the lenses L16 and L17 configuring the cemented lens CL31 included in the third lens group G3. Further, as for the second lens group G2 including the cemented lens CL21 configured by the lenses L6, L7 and L8, and the cemented lens CL22 configured by the lenses L9 and L10, conditional expression (7) represents the values of the lenses L6 and L7, lenses L7 and L8, and the lenses L9 and L10. In this way, it is seen that all the conditional expressions (1) to (9) are satisfied in the second example. FIG. 4 shows aberration diagrams representing spherical aberrations, astigmatisms, and coma aberrations of the microscope objective lens OL2 according to the second example. As is apparent from each of the aberration diagrams, it is seen that, also in the second example, the respective aberrations are well corrected, and excellent image forming performance is secured.

Third Example

Figure 5:
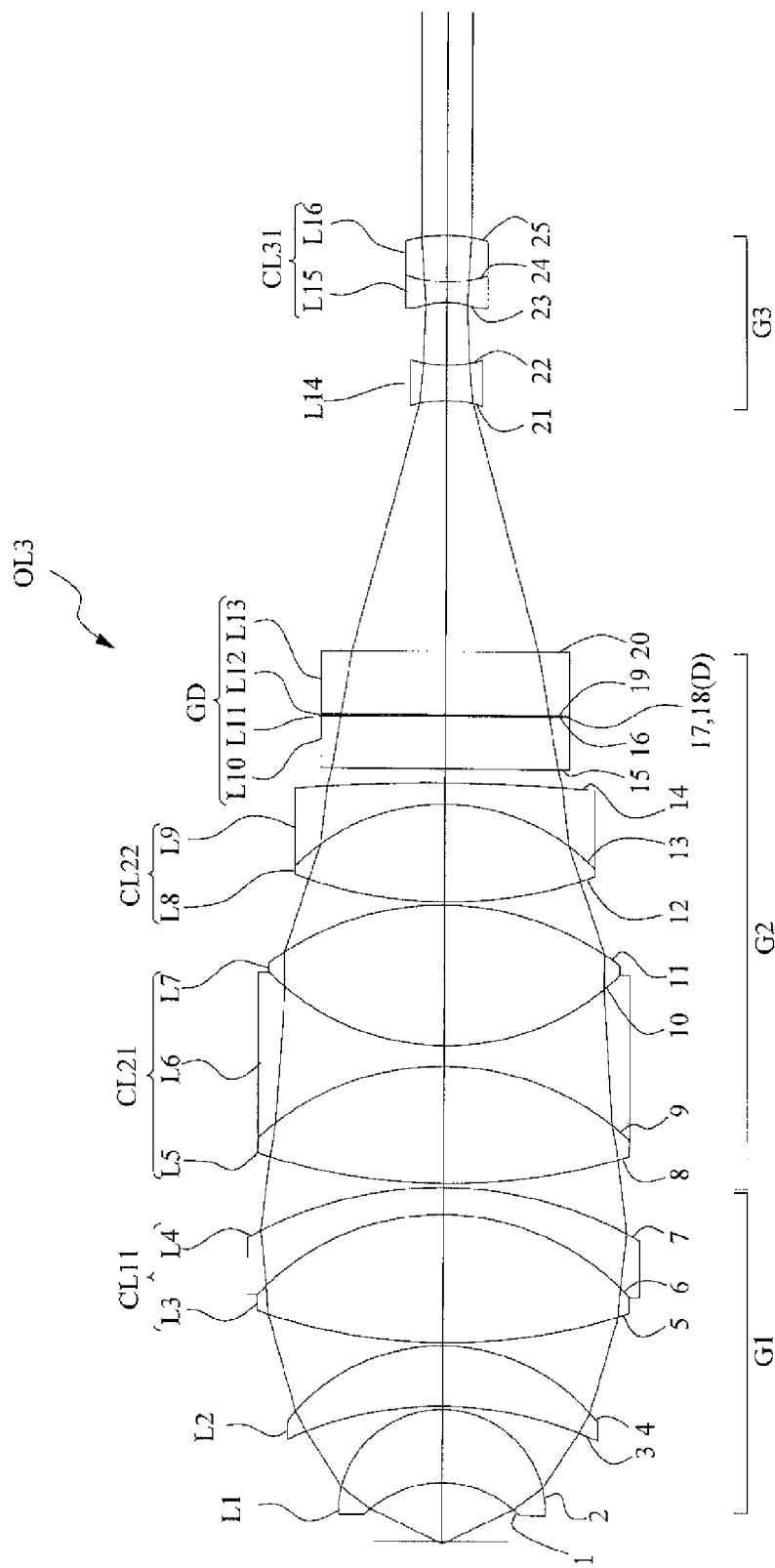
FIG. 5 is a view showing a lens configuration of a microscope objective lens according to a third example.

Next, the microscope objective lens OL3 shown in FIG. 5 will be described as a third example. The microscope objective lens OL3 shown in FIG. 5 is also configured by, in order from the object side, a first lens group G1 having positive refractive power, a second lens group G2 having positive refractive power, and a third lens group G3 having negative refractive power. The first lens group G1 is configured by, in order from the object side, a positive meniscus lens L1 whose concave surface is directed to the object side, a positive meniscus lens L2 whose concave surface is directed to the object side, and a cemented lens CL11 formed by bonding together a biconvex lens L3 and a negative meniscus lens L4 whose concave surface is directed to the object side. Further, the second lens group G2 is configured by, in order from the object side, a cemented lens CL21 formed by bonding a biconvex lens L5, a biconcave lens L6, and a biconvex lens L7 to each other, a cemented lens CL22 formed by bonding together a biconvex lens L8 and a negative meniscus lens L9 whose concave surface is directed to the object side, and a plate-shaped diffractive optical element GD including a diffractive optical surface D. Further, the third lens group G3 is configured by, in order from the object side, a biconcave lens L14, and a cemented lens CL31 formed by bonding a biconcave lens L15 and a biconvex lens L16.

Further, in the diffractive optical element according to the third example, which is also a contact multi-layered diffractive optical element, a plate-shaped optical glass L10, two optical members L11 and L12 which are respectively formed of different resin materials, and a plate-shaped optical glass L13 are bonded together in this order, and diffraction grating grooves (diffractive optical surface D) are formed on the bonding surface of the optical members L11 and L12.

Table 5 shows specifications of the microscope objective lens OL3 according to the third example shown in FIG. 5. Note that the surface numbers shown in Table 5 correspond to the surface numbers 1 to 25 shown in FIG. 5.

TABLE 5

F = 1.33 mm
NA = 0.9
β = 150x
d0 = 2.95
f1 = 7.7
f2 = 33.0
f12 = 8.2
f3 = −4.8
Φmax = 17.83
ΦDOE = 10.15

| m | r | d | nd | vd |
|---|---|---|---|---|
| 1 | −5.290 | 3.50 | 1.804 | 39.6 |
| 2 | −5.030 | 0.15 | | |
| 3 | −18.200 | 2.90 | 1.603 | 65.5 |
| 4 | −9.566 | 0.15 | | |
| 5 | 27.978 | 6.20 | 1.498 | 82.6 |
| 6 | −12.264 | 1.30 | 1.569 | 56.0 |
| 7 | −19.297 | 0.20 | | |
| 8 | 30.758 | 5.60 | 1.498 | 82.6 |
| 9 | −13.300 | 1.00 | 1.673 | 38.2 |
| 10 | 12.192 | 6.70 | 1.498 | 82.6 |
| 11 | −14.331 | 0.15 | | |
| 12 | 21.570 | 4.70 | 1.498 | 82.6 |
| 13 | −10.130 | 1.00 | 1.804 | 39.6 |
| 14 | −89.173 | 0.70 | | |
| 15 | 0.000 | 2.50 | 1.517 | 64.1 |
| 16 | 0.000 | 0.06 | 1.528 | 34.7 |
| 17 | 0.000 | 0.00 | 10001.000 | −3.5 |
| 18* | 0.000 | 0.06 | 1.557 | 50.2 |
| 19 | 0.000 | 3.00 | 1.517 | 64.1 |
| 20 | 0.000 | 12.00 | | |
| 21 | −6.151 | 1.70 | 1.517 | 52.4 |
| 22 | 6.151 | 3.00 | | |
| 23 | −4.178 | 1.00 | 1.734 | 51.5 |
| 24 | 6.681 | 2.20 | 1.785 | 25.6 |
| 25 | −7.986 | | | |

Diffractive optical surface data

| Eighteenth surface | κ = 1 A2 = −7.3529E−08 A4 = 1.2704E−09 A6 = −3.6213E−11 A8 = 1.4394E−13 A10 = 0.00000E+00 |
|---|---|

Values corresponding to conditions (1) n1 = 1.804
(2) (−r1)/F = 3.98
(3) ΦDOE/Φmax = 0.57
(4) f12/(−f3) = 1.7
(5) fDOE/F = 511.3
(6) ΔθgF3/Δv3 = −0.0026
(7) ΔθgF2/Δv2 = −0.0008, −0.0008, −0.0008
(8) f1/F = 5.8
(9) f2/F = 24.8

Figure 6:
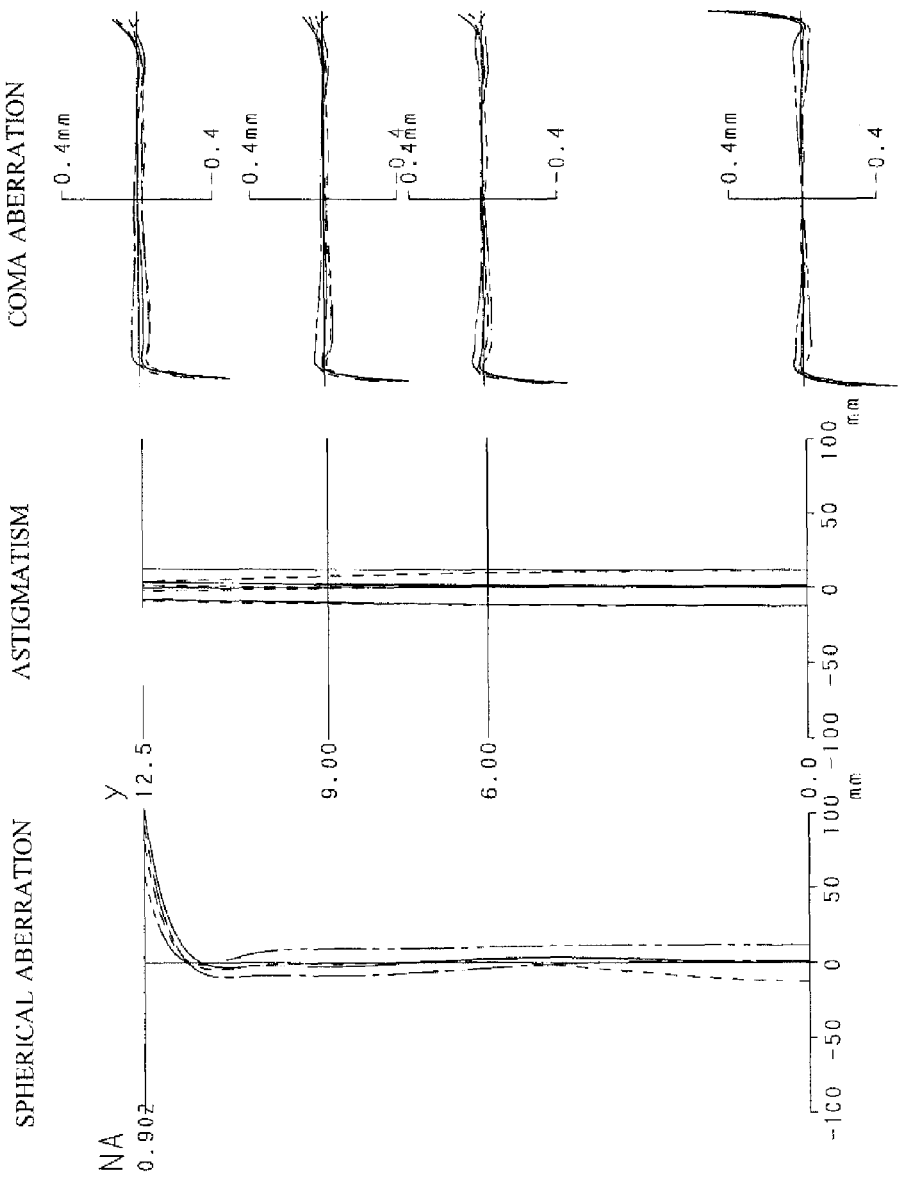
FIG. 6 shows aberration diagrams of the microscope objective lens according to the third example.

Note that, among the values corresponding to the conditions shown in Table 5, conditional expression (6) represents the value of the lenses L15 and L16 configuring the cemented lens CL31 included in the third lens group G3. Further, as for the second lens group G2 including the cemented lens CL21 configured by the lenses L5, L6 and L7, and the cemented lens CL22 configured by the lenses L8 and L9, conditional expression (7) represents the values of the lenses L5 and L6, the lenses L6 and L7, and the lenses L8 and L9. In this way, it is seen that all the conditional expressions (1) to (9) are satisfied in the third example. FIG. 6 shows aberration diagrams representing spherical aberrations, astigmatisms, and coma aberrations of the microscope objective lens OL3 according to the third example. As is apparent from each of the aberration diagrams, it is seen that, also in the third example, the respective aberrations are well corrected, and excellent image forming performance is secured.

REFERENCE SIGNS LIST

OL (OL1 to OL3) Microscope objective lens
G1 First lens group
L1 Positive meniscus lens
G2 Second lens group
G3 Third lens group
GD Diffractive optical element
CL21, CL22, CL31 Cemented lens

The invention claimed is:

1. A microscope objective lens comprising, in order from an object side,
   a first lens group having positive refractive power,
   a second lens group having positive refractive power, and
   a third lens group having negative refractive power, wherein
   the first lens group includes, on the most object side, a positive meniscus lens whose concave surface is directed to the object side,
   the second lens group includes a diffractive optical element having positive refractive power, and
   the microscope objective lens satisfying the following expressions:

$0.5 \leq (-r1)/F \leq 4.2$ $2 \leq f1/F \leq 10$ $15 \leq f2/F \leq 30$ where a radius of curvature of the most object side lens surface of the first lens group is set as r1, a focal length of the whole lens system is set as F, a focal length of the first lens group is set as f1, and a focal length of the second lens group is set as f2.

2. The microscope objective lens according to claim 1, wherein
   the diffractive optical element is arranged at a position closer to an image than a portion at which a diameter of a light flux passing through the first lens group and the second lens group is the largest.

3. The microscope objective lens according to claim 1, satisfying the following expression:

$n1 \geq 1.8$ where a refractive index relative to a d-line of a medium of the positive meniscus lens included in the first lens group is set as n1.

4. The microscope objective lens according to claim 1, satisfying the following expression:

$\Phi DOE/\Phi max < 0.9$ where the maximum diameter of the light flux passing through the first lens group and the second lens group is set as $\Phi max$, and the maximum diameter of a light flux passing through a diffractive optical surface of the diffractive optical element is set as $\Phi DOE$.

5. The microscope objective lens according to claim 1, satisfying the following expression:

$0.3 \leq f12/(-f3) \leq 2$ where a combined focal length of the first lens group and the second lens group is set as f12 and a focal length of the third lens group is set as f3.

6. The microscope objective lens according to claim 1, satisfying the following expression:

$100 \leq fDOE/F \leq 1000$ where a focal length of the diffractive optical element is set as fDOE.

7. The microscope objective lens according to claim 1, wherein
   the third lens group includes at least one cemented lens comprising a positive lens and a negative lens,
   the microscope objective lens satisfying the following expression:

$-0.0035 \leq \Delta\theta gF3/\Delta v3 \leq -0.002$ where a partial dispersion ratio $\theta gF$ is defined as $\theta gF = (ng-nF)/(nF-nC)$, with a refractive index relative to a g-line being set as ng, a refractive index relative to an F-line being set as nF, and a refractive index relative to a C-line being set as nC; a difference in the partial dispersion ratio between the positive lens and the negative lens which configure the cemented lens provided in the third lens group is set as $\Delta\theta gF3$; and a difference in the Abbe number between the positive lens and the negative lens is set as $\Delta v3$.

8. The microscope objective lens according to claim 1, wherein
   the second lens group includes at least one cemented lens comprising a positive lens and a negative lens,
   the microscope objective lens satisfying the following expression:

$-0.0025 \leq \Delta\theta gF2/\Delta v2 \leq -0.0006$ where a partial dispersion ratio $\theta gF$ is defined as $\theta gF = (ng-nF)/(nF-nC)$, with a refractive index relative to a g-line being set as ng, a refractive index relative to an F-line being set as nF, and a refractive index relative to a C-line being set as nC; a difference in the partial dispersion ratio between the positive lens and the negative lens which configure the cemented lens provided in the second lens group is set as $\Delta\theta gF2$, and a difference in the Abbe number between the positive lens and the negative lens is set as $\Delta v2$.

* * * * *